(12) United States Patent
Artaud et al.

(10) Patent No.: US 11,584,536 B2
(45) Date of Patent: Feb. 21, 2023

(54) METHOD AND DEVICE FOR INERTING A FUEL TANK

(71) Applicant: ZODIAC AEROTECHNICS, Roche la Moliere (FR)

(72) Inventors: Benoît Artaud, Saint-Etienne (FR); Christophe Claris, Saint-Etienne (FR); Olivier Vandroux, Grenoble (FR); Thibaut Vozy, Soucieu en Jarrest (FR)

(73) Assignee: ZODIAC AEROTECHNICS, Roche la Moliere (FR)

( * ) Notice: Subject to any disclaimer, the term of this patent is extended or adjusted under 35 U.S.C. 154(b) by 24 days.

(21) Appl. No.: 15/032,144

(22) PCT Filed: Oct. 28, 2014

(86) PCT No.: PCT/FR2014/052733
§ 371 (c)(1),
(2) Date: Apr. 26, 2016

(87) PCT Pub. No.: WO2015/063406
PCT Pub. Date: May 7, 2015

(65) Prior Publication Data
US 2016/0257419 A1   Sep. 8, 2016

(30) Foreign Application Priority Data

Oct. 31, 2013 (FR) ...................... 1360724

(51) Int. Cl.
*B64D 37/32* (2006.01)
*A62C 99/00* (2010.01)
*A62C 3/08* (2006.01)
(52) U.S. Cl.
CPC ................ *B64D 37/32* (2013.01); *A62C 3/08* (2013.01); *A62C 99/0018* (2013.01)

(58) Field of Classification Search
CPC ........ B64D 37/32; A62C 99/0018; A62C 3/08
See application file for complete search history.

(56) References Cited

U.S. PATENT DOCUMENTS

| 4,378,920 A | 4/1983 | Runnels et al. |
| 6,182,714 B1 * | 2/2001 | Ginsburgh ........... B67D 7/0476 141/63 |

(Continued)

FOREIGN PATENT DOCUMENTS

| EP | 2233175 A1 | 9/2010 |
| WO | WO-2009/141400 A2 | 11/2009 |

(Continued)

OTHER PUBLICATIONS

Richard L. Johnson, Aircraft Fuel Tank Inerting System, Jul. 1983, Aero Propulsion Laboratory, p. 60 section 4-4 (Year: 1983).*

(Continued)

*Primary Examiner* — Christian Chace
*Assistant Examiner* — Jordan S Fei
(74) *Attorney, Agent, or Firm* — Marshall, Gerstein & Borun LLP

(57) ABSTRACT

A method and a system for inerting an aircraft fuel tank includes at least one inert gas generator. The device includes at least means of determining the inert gas requirement of the aircraft tank(s) in real-time, means of regulating the inert gas flow rate of an inert gas generator, and controlled distribution means of the inert gas in the various fuel tanks and/or various compartments of an aircraft fuel tank. A control unit is capable of real-time determination of an inert gas flow rate setting according to the inert gas requirement of the tank(s) of the aircraft transmitted by the means of determining the inert gas requirement, the settings being transmitted in real time to the inert gas flow rate regulating means, and is also capable of determining the inert gas distribution control settings to the controlled distribution (Continued)

means of inert gas into the various fuel tanks and/or various compartments of a fuel tank.

10 Claims, 1 Drawing Sheet

(56) References Cited

U.S. PATENT DOCUMENTS

| | | | | |
|---|---|---|---|---|
| 7,828,874 | B2* | 11/2010 | Surawski | B64D 37/32 244/135 R |
| 2005/0224654 | A1* | 10/2005 | Loss | B64D 37/32 244/129.2 |
| 2006/0021652 | A1* | 2/2006 | Surawski | B64D 37/32 137/209 |
| 2007/0023577 | A1 | 2/2007 | Jones | |
| 2007/0054610 | A1* | 3/2007 | Jensen | B64D 37/32 454/74 |
| 2010/0236796 | A1* | 9/2010 | Chattaway | A62C 37/44 169/46 |
| 2011/0062288 | A1* | 3/2011 | Cremers | B64D 13/06 244/135 R |
| 2012/0035406 | A1* | 2/2012 | Lam | B64D 37/34 585/860 |
| 2012/0325811 | A1* | 12/2012 | Hagh | B01D 53/75 220/88.3 |
| 2013/0294950 | A1* | 11/2013 | Massey | B64D 37/32 418/83 |
| 2015/0041011 | A1* | 2/2015 | Tiger | B64D 37/32 137/624.27 |

FOREIGN PATENT DOCUMENTS

| | | | |
|---|---|---|---|
| WO | WO-2012/076373 A2 | 6/2012 | |
| WO | WO-2013135981 A1 * | 9/2013 | B64D 37/32 |

OTHER PUBLICATIONS

International Search Report issued in PCT/FR2014/052733 dated Mar. 26, 2015.
Written Opinion issued in PCT/FR2015/052733 dated Mar. 26, 2015.
Bahrami, Ali, "*Advisory Circular*" *U.S. Department of Transportation, Federal Aviation Administration*, Sep. 19, 2008.

* cited by examiner

METHOD AND DEVICE FOR INERTING A FUEL TANK

CROSS-REFERENCE TO RELATED APPLICATIONS

This application is a national stage application under 35 U.S.C. § 371 and claims the benefit of priority of international application no. PCT/FR2014/052733, filed Oct. 28, 2014, which claims the benefit of priority under 35 U.S.C. §. 119 of French patent application no. 1360724, filed Oct. 31, 2013, the entire contents of each being hereby incorporated herein by reference, in its entirety and for all purposes.

TECHNICAL FIELD

This disclosure concerns a method and a device for inerting an aircraft fuel tank, as used on an aircraft, helicopter or similar.

BACKGROUND

In the aeronautical field, there is a known method of using inerting system to generate and introduce nitrogen, or any other neutral gases such as carbon dioxide, for instance, to fuel tanks for safety reasons, to reduce the risk of the fuel exploding.

These inerting systems are known under the abbreviation of OBIGGS (On Board Inert Gas Generation Systems).

A conventional inerting system of the prior art is shown in FIG. 1. This inerting system includes an on-board inert gas generation system known as OBIGGS (1) supplied with air by purged air taken from the engines. Indeed, the purged air diverted from the engines is currently the most widely used model. In such systems, the purged air is generally deviated from one or several engines by means of a so-called intermediate pressure opening and/or a so-called high pressure opening, depending on the flight situation. It will be noted that the use of an air purge for air conditioning is advantageous because the air purge is at a relatively high pressure, and also has a relatively high temperature, so that the air can be adjusted over a wide range of desired pressures and temperatures. The OBIGGS system (1) is coupled to the aircraft fuel tank (2) and separates the oxygen from the air.

Generally, the OBIGGS system (1) consists of an air separation module which contains, for instance, zeolite membranes through which a flow of air is pressed. Because of the different rates of mass transfer of nitrogen and oxygen, the system divides the flow of air so that an airflow with a high nitrogen content and an airflow with a high oxygen content are obtained. The fraction of air enriched with nitrogen is fed into the fuel tanks so that the mixture of air and kerosene vapour in this volume is displaced. The fraction of oxygen-enriched air is generally not reused. Alternatively, the fraction of oxygen-enriched air is fed back into the passenger compartment after treatment with appropriate means and/or into the jet engine combustion chamber to improve combustion. The devices required for this operation, such as compressors, filters, air and water cooling modules and similar devices are incorporated into the inert gas installation. These oxygen-enriched air treatment devices generate an extra cost while increasing the weight and dimensions of the inerting devices.

Accordingly, the oxygen can then be released from the OBIGGS system (1), and the oxygen depleted air can be fed into the fuel tank (2) and more specifically into the empty part of the tank to evacuate the mixture of air and kerosene vapour out of the tank (2). The fuel can then be fed into the engines or the so-called APU, (Auxiliary Power Unit) thus generating energy. Accordingly, when the ratio between the fuel and the oxygen in the empty part of the tank (2) is less than the defined ignition limit, in accordance with the requirements of the FAA, in English standing for the "Federal Aviation Administration", as described in detail in the document AC25.981-2A of 19 Sep. 2008 entitled "FUEL TANK FLAMMABILITY REDUCTION MEANS" and its annexes, no spontaneous ignition can take place.

As an alternative, the inerting systems can also be fed with air extracted from the passenger compartment or by air taken from outside the aircraft. The air in the passenger compartment is regularly renewed by supplying the fresh air to the compartment and simultaneously evacuating the waste air from it.

Many inerting systems have been described in the prior art. In particular, this is the case of the American U.S. Pat. No. 7,172,156 which describes an inert gas installation supplied with aircraft engine purged air. The purged air is previously conditioned by means of filters and heat exchangers before it reaches the air separation module. The fraction of the air, enriched with nitrogen, is offended to the fuel tanks and the fraction of the oxygen-enriched air is evacuated into the environment outside the aircraft. The inerting system also includes a compressor and a turbine which results in the inert gas generating system becoming more complex, and adding to its weight.

There is also a known document WO 2012076373 which describes an on-board inert gas generating system. The system receives air from the passenger compartment, or air from another source at a relatively low pressure, passes part of it through an energy recovery turbine to the ambient air to extract the energy used to supply all or part of the energy needed to drive a volumetric compressor and compress another part of the compartment air to increase its pressures so that it is appropriate for feeding an air separation module (24). The compressed air is then cooled and supplied into the air separation module to generate nitrogen-enriched air to render it inert. The compartment air can then be used as cooling air for the process of heating a heat exchanger which extracts the heat from the compressed compartment air before supplying it to the air separation module. The energy recovery turbine can drive a volumetric compressor directly, or can drive a generator whose energy is used, possibly combined with the energy from the energy source of the aircraft, to drive an electric motor itself driving the volumetric compressor.

Finally, there is also a known American patent application US 2011/062288 describing an inerting system intended for an aircraft. The inerting system includes an air separating module which has at least one air inlet, a first air outlet and a second air outlet. The air separating module is built in order to divide a flow of incoming air into a first air flow and a second air flow wherein the first airflow is enriched with oxygen compared to the incoming air flow and evacuated by the first and outlet and the second airflow is enriched with nitrogen with respect to the incoming air flow and which is evacuated by the second air outlet.

All these inerting systems have the drawback of consuming a great deal of energy in producing the air depleted to the maximum of the capacity of the OBIGGS inert gas generating system and whatever the real requirement of the fuel tank or tanks. These inerting systems, in addition to consuming large amounts of energy, are oversized and increase the airborne weight of the aircraft pointlessly.

SUMMARY OF THE DISCLOSURE

One of the purposes of the disclosed embodiments is therefore to remedy these drawbacks by proposing a device and a method for the inerting of an aircraft fuel tank, or a similar system, simple in design and at a low cost, and which adapts the distribution of the inert gas to the real requirements for inert gas, in particular, to indirectly reduce the fuel consumption.

To this end, an inerting device for one or several aircraft fuel tanks is proposed, which device includes at the least:
- an inert gas generator supplied with purged air diverted from the engines and/or air drawn from the passenger compartment,
- means of determining the inert gas requirement of the aircraft tank or tanks in real time during the use of the aircraft,
- means of regulating the flow rates of the inert gas generator,
- means of the controlled distribution of the inert gas to the various tanks and/or the various compartments of a tank and,
- a control unit, on the one hand, capable of determining in real time a flow setting for the inert gas generator according to the inert gas requirement of the tank or tanks transmitted by means of determining, said setting of being transmitted in real time to the regulating means, and on the other hand, capable of determining the inert gas distribution control settings for the various tanks and/or the various compartments of a tank, with said settings being transmitted to the controlled distribution means in real time.

According to one characteristic, the means of determination include:
- a multitude of sensors capable of measuring in real time, in the tank or the tanks and/or the various compartments of a tank, the volume of fuel, and/or the quantity of oxygen, and/or the temperature,
- means of processing information relative to the flight of the aircraft and,
- means of calculating the inert gas requirement as a function of measurements from the sensors, and information relative to the flight of the aircraft.

It will be readily understood that, unlike the inerting devices of the prior art which constantly distributes an inert gas, such as nitrogen or oxygen-depleted air, to the maximum capacities of the inert gas generating device, the device allows the distribution of the inert gas to be adjusted to the real inert gas requirements. In this way, the device is capable of indirectly reducing the fuel consumption.

The information concerning the flight of the aircraft consist in the altitude of the aircraft and/or the speed of the aircraft and/or the flight phase of the aircraft.

Preferably, the inert gas generator consists of a zeolite separation membrane gas generator and/or a fuel battery cell.

Furthermore, the means of regulating the flow of inert gas from the inert gas generator and the energy consumption of the inert gas generator are connected to a pressure source.

The pressure source consists of a pressure coming from the aircraft jet engine and/or an electric compressor and/or a turbo compressor.

In addition, the control unit includes an initial algorithm for determining in real time an inert gas flow rate setting for the inert gas generator depending on the inert gas requirement of the aircraft tank or tanks, transmitted by means of determining the inert gas requirement, said settings being transmitted in real-time to the means of inert gas flow rate regulation of the inert gas generator, and a second algorithm determining the inert gas distribution control settings for the means of inert gas controlled distribution into the various tanks of the aircraft and/or the various compartments of a fuel tank on the aircraft.

In addition, the first algorithm allows the real-time determination of an energy consumption setting for the inert gas generator depending on the inert gas requirement of the aircraft tank or tanks, transmitted by the means of determining the inert gas requirement.

Another object of the disclosed embodiments concerns a method for inerting one or several aircraft fuel tanks, such as those of an aircraft or helicopter, for instance, or a similar device, comprising at least one inert gas generator known as the OBIGGS device supplied with air from the purged air divergent from the engines and/or the air from the passenger compartment and/or by air drawn from outside the aircraft; the method comprises at least the following steps for:

i) determining the inert gas requirement of the aircraft tank or tanks in real time during the use of the aircraft, ii) determining in real time of an inert gas generator flow rate setting depending on the inert gas requirement of the tank or tanks, transmitted by means of determining the inert gas requirement, and previously calculated according to a real-time measurement, to the tank or tanks and/or the various compartments of a tank, the volume of fuel, and/or the quantity of oxygen, and/or the temperature, and information relative to the flight of the aircraft, the settings being transmitted in real time to means of regulating the inert gas generator flow rate, iii) Determining the inert gas distribution control settings in the various tanks and/or the various compartments of a tank, the settings being transmitted in real time to the inert gas controlled distribution means in the various tanks and/or the various compartments of a tank.

BRIEF DESCRIPTION OF FIGURES

Other advantages and properties will be better understood from the following description of a single variant of the design, given as a non-limiting example, of the on-board fuel tank inerting method and system, referring to the attached illustrations in which.

DETAILED DESCRIPTION

Figure 1:
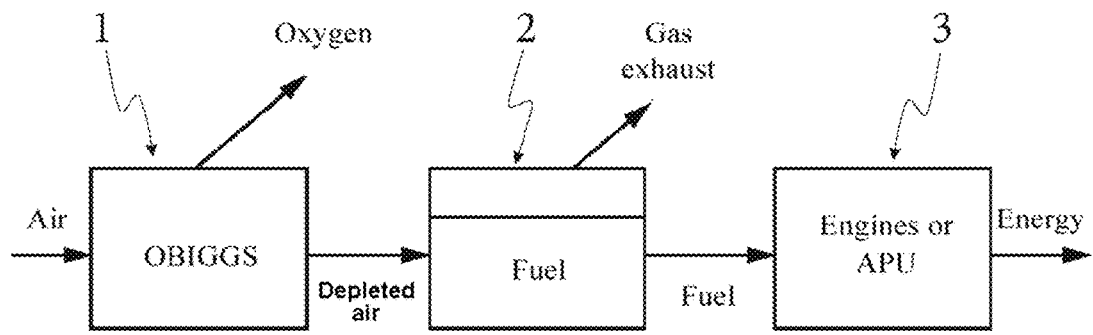
FIG. 1 is a schematic representation of an inerting system of a prior art.
Figure 2:
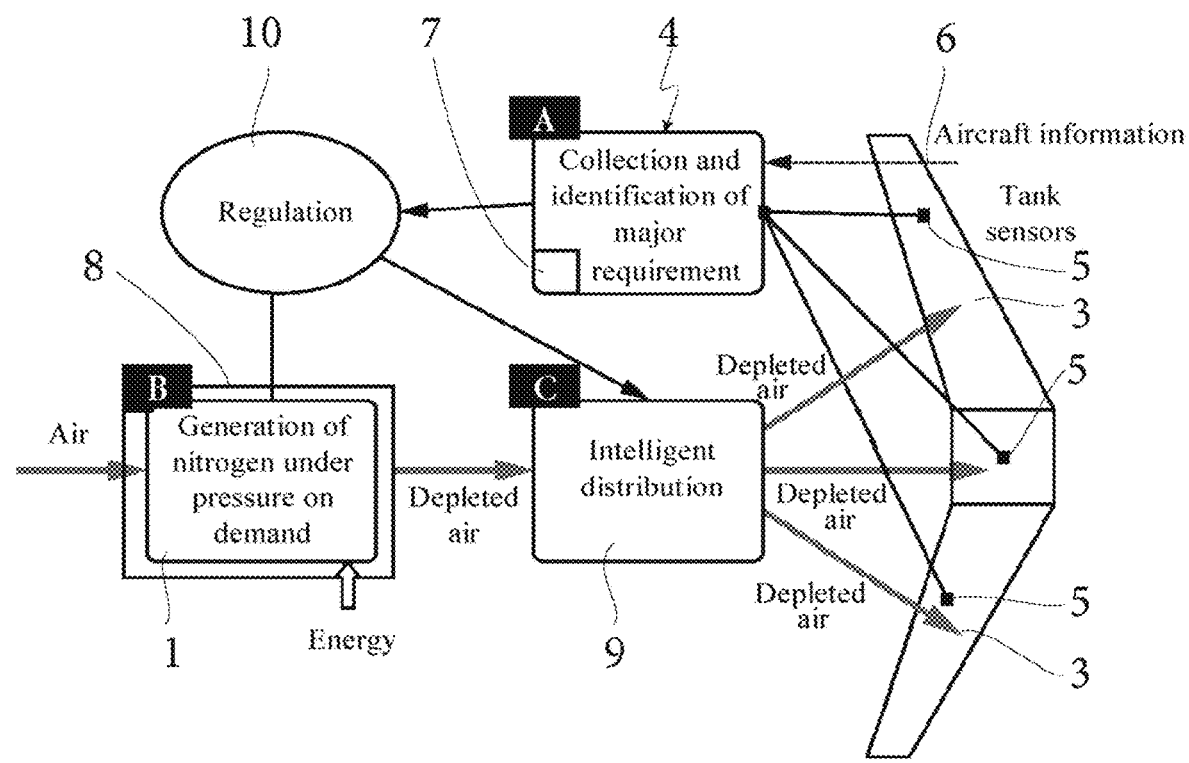
FIG. 2 is a schematic representation of an inerting system according to the described embodiments.

With reference to FIG. 2, an on-board inerting system used in the fuel tank of an airborne craft, such as an aircraft or a helicopter, for instance, or a similar device, includes an on-board inert gas generating system known as OBIGGS (1) supplied with air from purged air diverted from the engines and or air from the passenger compartment for instance. The inert gas generator (1) includes a depleted air outlet. The inert gas generator may consist in any inert gas generator (1) known to the man of the art, such as a zeolite separating membrane gas generator and/or a fuel battery cell for instance.

It is understood that the device may include a multitude of inert gas generators (1) assembled in series or in parallel, without moving out of the framework of the disclosed embodiments.

Furthermore, the device includes means of determining the inert gas requirement of the aircraft tank or tanks in real time during the use of the aircraft. The means of determining (4) the inert gas requirement of the aircraft tank or tanks (3) in real time during the use of the aircraft includes a multitude of sensors (5) capable of measuring in real-time the volume of fuel contained in the tank or the tanks (3) and/or the various compartments of a tank (3) and/or the quantity of oxygen contained in the tank or the tanks (3) and/or the various compartments of a tank (3) and/or the temperature, means of processing (6) information concerning the flight of the aircraft and means of calculating (7) the inert gas requirement according to measurements of the fuel volume in the tank or tanks (3) and/or in the various compartments of a tank (3) and/or the quantity of oxygen contained in the tank or the tanks (3) and/or in the various compartments of a tank (3), and/or the temperature, and information relative to the flight of the aircraft. The information concerning the flight of the aircraft consists for instance in the altitude of the aircraft and/or the speed of the aircraft and/or the flight phase of the aircraft being supplied by the on-board aircraft computer.

The device also includes means of regulating (8) the flow rate of the inert gas from the inert gas generator (1) and, additionally, of the energy consumption of the inert gas generator (1) and means of control the distribution (9) of the inert gas into the various fuel tanks (3) and/or into the various compartments of a fuel tank (3) on the aircraft. It will be noted that the means of regulating (8) the flow rate of the inert gas from the inert gas generator (1) and, additionally, the energy consumption of the inert gas generator are connected to an air pressure source procuring a source of energy, the pressure source consisting, for instance, in a pressure coming from the aircraft jet engine and/or an electric compressor and/or a turbo-compressor.

Evidently, the source of energy could consist in a source of electric energy such as a battery cell for instance, or a source of mechanical energy such as a rotating shaft, for example.

In addition, the device includes a control unit (10) connected to the means of determining the inert gas requirement (4) of the tank or tanks (3) of the aircraft, to the means of regulating the inert gas flow rate (8) of the inert gas generator (1) and to means (9) controlling the distribution of inert gas to the various fuel tanks (3). The control unit (10) includes an initial algorithm for determining in real time and inert gas flow rate setting from the inert gas generator (1) depending on the inert gas requirement of the aircraft tank or tanks (3), transmitted by means (4) of determining the inert gas requirement, said settings being transmitted in real-time to the means (8) of inert gas flow rate regulation of the inert gas generator (1), and of the energy consumption of the inert gas generator (1), and a second algorithm determining the inert gas distribution control settings to the means (9) of inert gas controlled distribution into the various tanks (3) of the aircraft and/or the various compartments of a fuel tank (3) on the aircraft.

In addition, the first algorithm of the control unit (10) can also ensure the real-time determination of an energy consumption setting for the inert gas generator (1) depending on the inert gas requirement of the aircraft tank or tanks (3), transmitted by the means (4) of determining the inert gas requirement.

We will now explain the operation of the device with reference to FIG. 2.

In a first step, the means of determination (4) calculate the inert gas requirement according to the measurements of the fuel volume contained in the tank or tanks (3) and/or in the various compartments of a tank (3) and/or the quantity of oxygen contained in the tank or tanks (3) and/or in the various compartments of a tank (3), and/or the temperature, measured by means of sensors (5) and of information relative to the flight of the aircraft (altitude and/or speed and/or flight phase).

This information about the inert gas requirement is transmitted in real time to the control unit (10) which determines, in a second stage, in real time, a setting for the inert gas flow rate of the inert gas generator (1) and, additionally, of the energy consumption of the inert gas generator (1) according to the inert gas requirement of the aircraft tank or tanks (3), transmitted by the means (4) of the determining the inert gas requirement calculated previously. The settings are transmitted in real time to regulating means (8) of the inert gas flow rate of the inert gas generator (1) and of the energy consumption of the inert gas generator (1). The control unit (10) also determines the inert gas distribution control settings to the various fuel tanks (3) and/or to the various components of a fuel tank (3) on the aircraft. These settings are transmitted in real time to the controlled distribution means (9) of the inert gas in the various fuel tanks (3) and or the various compartments of a fuel tank (3) on the aircraft. The controlled distribution means (9) then control the opening and closing of the solenoids of the inert gas distribution circuit to the various fuel tanks (3) and/or the various compartments of a fuel tank (3) on the aircraft.

It will be understood clearly that the device is capable of adapting the distribution of inert gas to the real inert gas requirement. In this way, the device is capable of indirectly reducing the fuel consumption.

It is obvious that the examples here are simply particular illustrations and are in no case limiting regarding the field of application of the disclosed embodiments.

The invention claimed is:

1. A method for inerting one or several fuel tanks on an aircraft, by means of at least one inert gas generator supplied with purged air diverted from the engines and/or the air from the passenger compartment, wherein the method comprises the following steps of:
    i) determining the inert gas requirement of the aircraft tank or tanks in real time during the use of the aircraft, according to at least an altitude and velocity of the aircraft,
    ii) determining in real time an inert gas generator flow rate setting depending on the inert gas requirement of the tank or tanks, transmitted by means for determining the inert gas requirement, and previously calculated according to (a) a real-time measurement in the tank or tanks and/or the various compartments of a tank, of the volume of fuel, and (b) information relative to the flight of the aircraft, the information relative to the flight of the aircraft comprising altitude and velocity, the settings being transmitted in real time to means for regulating the inert gas generator flow rate,
    iii) determining the inert gas distribution control settings in the various tanks and/or in the various compartments of a tank, the settings being transmitted in real time to the inert gas controlled distribution means in the various tanks and/or in the various compartments of a tank,
    (iv) determining in real-time an energy consumption setting for the inert gas generator depending on the inert gas requirement of the aircraft tank or tanks, transmitted by the means for determining the inert gas requirement, and (v) controlling the inert gas flow rate and the energy consumption for the inert gas generator according to the determined flow rate setting and the determined energy consumption setting respectively.

2. The method according to claim 1, further comprising: receiving the altitude and velocity from an onboard computer of the aircraft.

3. An inerting device for one or several aircraft fuel tanks, the device comprising:
   an inert gas generator supplied with purged air diverted from the engines and/or air drawn from the passenger compartment,
   means for determining the inert gas requirement of the aircraft tank or tanks in real time during the use of the aircraft,
   means for regulating the flow rates of the inert gas generator,
   means for controlled distribution of the inert gas to the various tanks and/or the various compartments of a tank and,
   a control unit configured to determine:
      in real time a flow setting for the inert gas generator according to the inert gas requirement of the tank or tanks transmitted by determining means, the flow setting being transmitted in real time to the regulating means,
      the inert gas distribution control settings for the various tanks and/or the various compartments of a tank, the distribution control settings being transmitted to the controlled distribution means in real time, and
      an energy consumption setting for the inert gas generator depending on the inert gas requirement of the aircraft tank or tanks,
   wherein the determination means comprise:
      a multitude of sensors capable of measuring in real time, in the tank or the tanks and/or the various compartments of a tank, the volume of fuel, and/or the quantity of oxygen, and/or the temperature,
      information processing means for processing information concerning the flight of the aircraft and,
      means for calculating the inert gas requirement as a function of measurements from the sensors, and information relative to the flight of the aircraft.

4. An inerting device according to claim 3, wherein the information concerning the flight of the aircraft comprises the altitude of the aircraft and/or the speed of the aircraft and/or the flight phase of the aircraft.

5. An inerting device for an aircraft fuel tank according to claim 3, wherein the inert gas generator consists of a zeolite separation membrane gas generator.

6. An inerting device for an aircraft fuel tank according to claim 3, wherein the inert gas generator consists of a fuel battery cell.

7. An inerting device for an aircraft fuel tank according to claim 3, wherein the means for regulating the inert gas flow rate of the inert gas generator are connected to a pressure source.

8. An inerting device for an aircraft fuel tank according to claim 7, wherein the pressure source comprises a pressure coming from the aircraft jet engine and/or an electric compressor and/or a turbo compressor.

9. An inerting device for an aircraft fuel tank according to claim 3, wherein the control unit is configured to execute (i) a first algorithm for determining in real time an inert gas flow rate setting from the inert gas generator depending on the inert gas requirement of the aircraft tank or tanks, transmitted by the means for determining the inert gas requirement, said inert gas flow rate setting being transmitted in real-time to the means for regulating the inert gas flow rate of the inert gas generator, and (ii) a second algorithm for determining the inert gas distribution control settings, and transmitting the inert gas distribution control settings to the means for inert gas controlled distribution.

10. An inerting device for an aircraft fuel tank according to claim 9, wherein the first algorithm of the control unit determines in real-time an energy consumption setting for the inert gas generator depending on the inert gas requirement of the aircraft tank or tanks, transmitted by the means for determining the inert gas requirement.

* * * * *